United States Patent
Warren et al.

(10) Patent No.: US 12,417,008 B1
(45) Date of Patent: Sep. 16, 2025

(54) THREE-DIMENSIONAL APPLICATION INSPECTION ENVIRONMENT

(71) Applicant: Apple Inc., Cupertino, CA (US)

(72) Inventors: Amanda K. Warren, London (GB);
James G. McCarter, Erie, CO (US);
David J. Addey, Santa Cruz, CA (US);
David A. Lipton, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/742,544

(22) Filed: Jun. 13, 2024

Related U.S. Application Data

(63) Continuation of application No. 18/215,353, filed on Jun. 28, 2023, now Pat. No. 12,099,694.

(60) Provisional application No. 63/357,519, filed on Jun. 30, 2022.

(51) Int. Cl.
| | |
|---|---|
| *G09G 5/00* | (2006.01) |
| *G06F 3/04815* | (2022.01) |
| *G06T 19/00* | (2011.01) |
| *G06T 19/20* | (2011.01) |

(52) U.S. Cl.
CPC ........ *G06F 3/04815* (2013.01); *G06T 19/006* (2013.01); *G06T 19/20* (2013.01); *G06T 2200/24* (2013.01); *G06T 2219/2004* (2013.01); *G06T 2219/2016* (2013.01)

(58) Field of Classification Search
CPC ...... G06F 3/011; G06F 3/018; G06F 3/04815; G06F 3/0484; G06F 3/04845; G02B 27/017; G02B 27/0179; G06T 13/20; G06T 13/80; G06T 16/006; G06T 16/20; G06T 2200/24; G06T 2219/2004; G06T 2219/2016
See application file for complete search history.

(56) References Cited

U.S. PATENT DOCUMENTS

| | | |
|---|---|---|
| 10,339,721 B1 | 7/2019 | Dascola et al. |
| 11,187,720 B2 | 11/2021 | Niles et al. |
| 11,270,671 B1 | 3/2022 | Dunn et al. |
| 11,341,704 B1 | 5/2022 | Lozada et al. |
| 11,385,761 B2 | 7/2022 | Dunn et al. |
| 11,644,941 B1 | 5/2023 | Wong et al. |
| 11,893,399 B2 * | 2/2024 | Kwon ................ G06F 11/3438 |

(Continued)

*Primary Examiner* — Joe H Cheng
(74) *Attorney, Agent, or Firm* — Thompson Hine LLP

(57) ABSTRACT

Various implementations disclosed herein include devices, systems, and methods that updates state information for a portion of a user interface. For example, an example process may include obtaining a recording of an execution of an application within a three-dimensional (3D) environment. The recording may include 3D appearance information and state information for elements of the application at multiple instances in time. The process may further include presenting a user interface based on the recording where the user interface includes a visualization portion providing a visualization of the 3D appearance of the application based on the 3D appearance information and a state information portion. The process may further include receiving a selection of an element and identifying element-specific information corresponding to the element at a particular instance and updating the state information portion of the user interface based on the selection of the element and the element-specific state information.

19 Claims, 9 Drawing Sheets

(56) References Cited

U.S. PATENT DOCUMENTS

| | | |
|---|---|---|
| 2020/0257615 A1 | 8/2020 | Richardson et al. |
| 2020/0304631 A1* | 9/2020 | Kim .................... H04M 1/2757 |
| 2021/0286701 A1 | 9/2021 | Casella et al. |
| 2022/0155863 A1 | 5/2022 | Wang et al. |
| 2023/0031832 A1 | 2/2023 | Lipton |
| 2023/0032771 A1 | 2/2023 | Zion |
| 2023/0290042 A1 | 9/2023 | Casella |

* cited by examiner

THREE-DIMENSIONAL APPLICATION INSPECTION ENVIRONMENT

CROSS-REFERENCE TO RELATED APPLICATIONS

This Application is a continuation of U.S. patent application Ser. No. 18/215,353 filed Jun. 28, 2023, now U.S. Pat. No. 12,099,694 B1, which claims the benefit of U.S. Provisional Application Ser. No. 63/357,519 filed Jun. 30, 2022, each of which is incorporated by reference herein in its entirety.

TECHNICAL FIELD

The present disclosure generally relates to integrated development environments, particularly integrated development environments for development and inspection of three-dimensional immersive content.

BACKGROUND

Integrated development environments (IDEs) provide user interfaces for developing and debugging computer-executable content. Existing IDEs may not be optimized for developing and debugging content for use in immersive three-dimensional environments. For example, existing IDEs may not adequately facilitate a user (e.g., app creator, developer, programmer, debugger, etc.) in developing and testing immersive content.

SUMMARY

Various implementations disclosed herein include devices, systems, and methods that provide an inspection and debugging user interface and associated workflow using a recording corresponding to a period of time during the use/testing of an application providing content in a three-dimensional (3D) environment such as extended reality (XR) environments (e.g., computer generated reality on a head mounted display/device). The inspection and debugging user interface and associated workflow includes a visualization portion (e.g., a simulator showing the 3D appearance at a particular time during the period) and an element data portion showing selected element-specific state info at a particular time during the period. The inspection and debugging user interface may also provide user info (e.g., hand, head, gaze, etc.), system performance information (e.g., memory usage, network usage), and environment information (e.g., re the wall to which an app is anchored). The inspection and debugging user interface may also provide a combination of a 3D simulator with selected element-specific state information. In some implementations, a first device is used to display a first inspection user interface on a two-dimensional display device (e.g., a laptop computer, tablet, etc.) to inspect some aspects of a recording and a second inspection user interface a 3D display device (e.g., a head mounted display (HMD)) to review the simulation (e.g., using a bounded volume application) and user interaction visualizations in an XR environment.

In general, one innovative aspect of the subject matter described in this specification can be embodied in methods, at an electronic device having a processor, that include the actions of obtaining a recording of an execution of an application within a three-dimensional (3D) environment for a time period, the recording including 3D appearance information and state information for elements of the application at multiple instances in time during the time period. The methods may further include the actions of presenting a user interface based on the recording, where the user interface includes a visualization portion providing a visualization of the 3D appearance of the application during the period of time based on the 3D appearance information, and a state information portion. The methods may further include the actions of receiving a selection of an element of the elements and identifying element-specific information corresponding to the element at a particular instance during the time period. The methods may further include the actions of updating the state information portion of the user interface based on the selection of the element and the element-specific state information.

These and other embodiments can each optionally include one or more of the following features.

In some aspects, the user interface further includes a system performance portion. In some aspects, the user interface further includes user information. In some aspects, the user interface further includes environment information. In some aspects, the user interface is displayed on a 2D display. In some aspects, the user interface is displayed on a 3D display within an extended reality (XR) environment.

In some aspects, the methods may further include the actions of transmitting information to a second device, wherein the second device presents a second user interface, and one of the device or second device has a 2D display and the other of the device or the second device has a 3D display. In some aspects, the methods may further include the actions of providing a selectable user interface option to export the recording to a second device having a different display type.

In some aspects, the user interface further includes time scrubbing tools for identifying the multiple instances in time. In some aspects, the visualization of the 3D appearance of the application enables display of the app from a viewpoint that is different than the viewpoint of the device during the capturing of the recording.

In some aspects, the methods may further include the actions of during execution of the application, an object of the application content is positioned based on a physics engine, and during playback, the object of the application content is positioned based on determining a position of the object based on the program state information and repositioning the object based on the changes.

In some aspects, the visualization of the 3D appearance of the application is displayed within a defining limited area within a 3D playback environment. In some aspects, the user interface includes controls to position and/or resize the 3D appearance of the application within the defining limited area.

In some aspects, the methods may further include the actions of presenting a second set of views of the recording of the execution of the application. In some aspects, the recording of the execution of the application is generated on a head-mounted device (HMD) that captures application state, user information, system performance information, and physical environment information.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
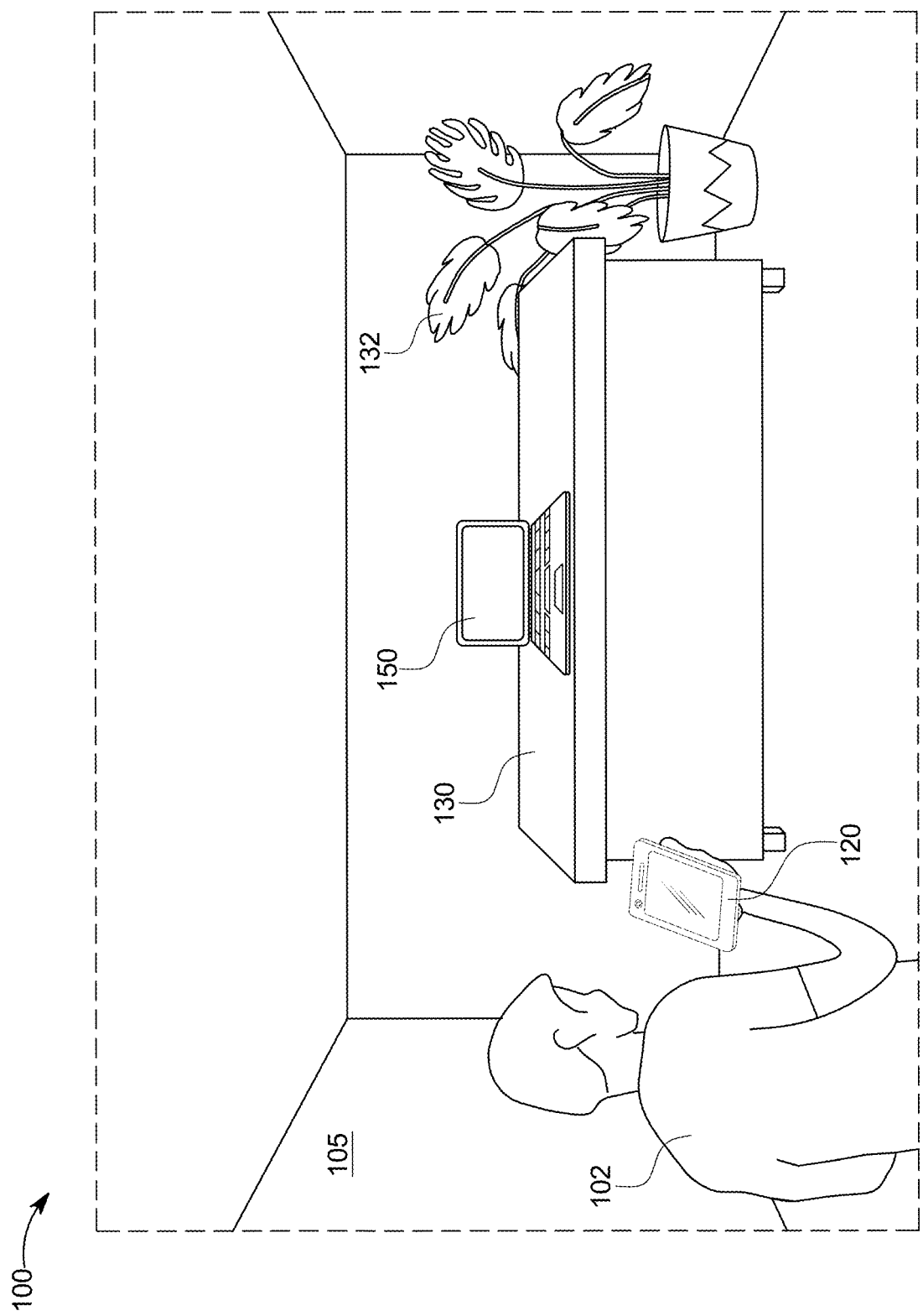
FIG. 1 is an example of a first device and a second device used within a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous specific details are provided herein to afford those skilled in the art a thorough understanding of the claimed subject matter. However, the claimed subject matter may be practiced without these details. In other instances, methods, apparatuses, or systems, that would be known by one of ordinary skill, have not been described in detail so as not to obscure claimed subject matter.

FIG. 1 illustrates an exemplary operating environment 100 in accordance with some implementations. In this example, the example operating environment 100 involves an exemplary physical environment 105 that includes physical objects such as desk 130 and plant 132. Additionally, physical environment 105 includes user 102 holding first device 120, and a second device 150 on top of the desk 130. In some implementations, the first device 120 is configured to present a computer-generated environment to the user 102. The presented environment can include extended reality features.

In some implementations, the first device 120 and/or the second device 150 is a handheld electronic device (e.g., a smartphone or a tablet). In some implementations, the first device 120 and/or the second device 150 is a near-eye device such as a head worn device. The first device 120 and/or the second device 150 utilizes one or more display elements to present views. For example, the first device 120 and/or the second device 150 can display views that include an integrated development environment (IDE) in the context of an extended reality environment. In some implementations, the first device 120 and/or the second device 150 may enclose the field-of-view of the user 102. In some implementations, the functionalities of first device 120 and/or the second device 150 are provided by more than one device. In some implementations, the first device 120 and/or the second device 150 communicates with a separate controller or server to manage and coordinate an experience for the user. Such a controller or server may be located in or may be remote relative to the physical environment 105.

A physical environment, such as physical environment 105, refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

According to some implementations, the electronic devices (e.g., first device 120, device 150, etc.) can generate and present an extended reality (XR) environment to one or more users during a communication session. In contrast to a physical environment that people can sense and/or interact with without aid of electronic devices, an XR environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2A:
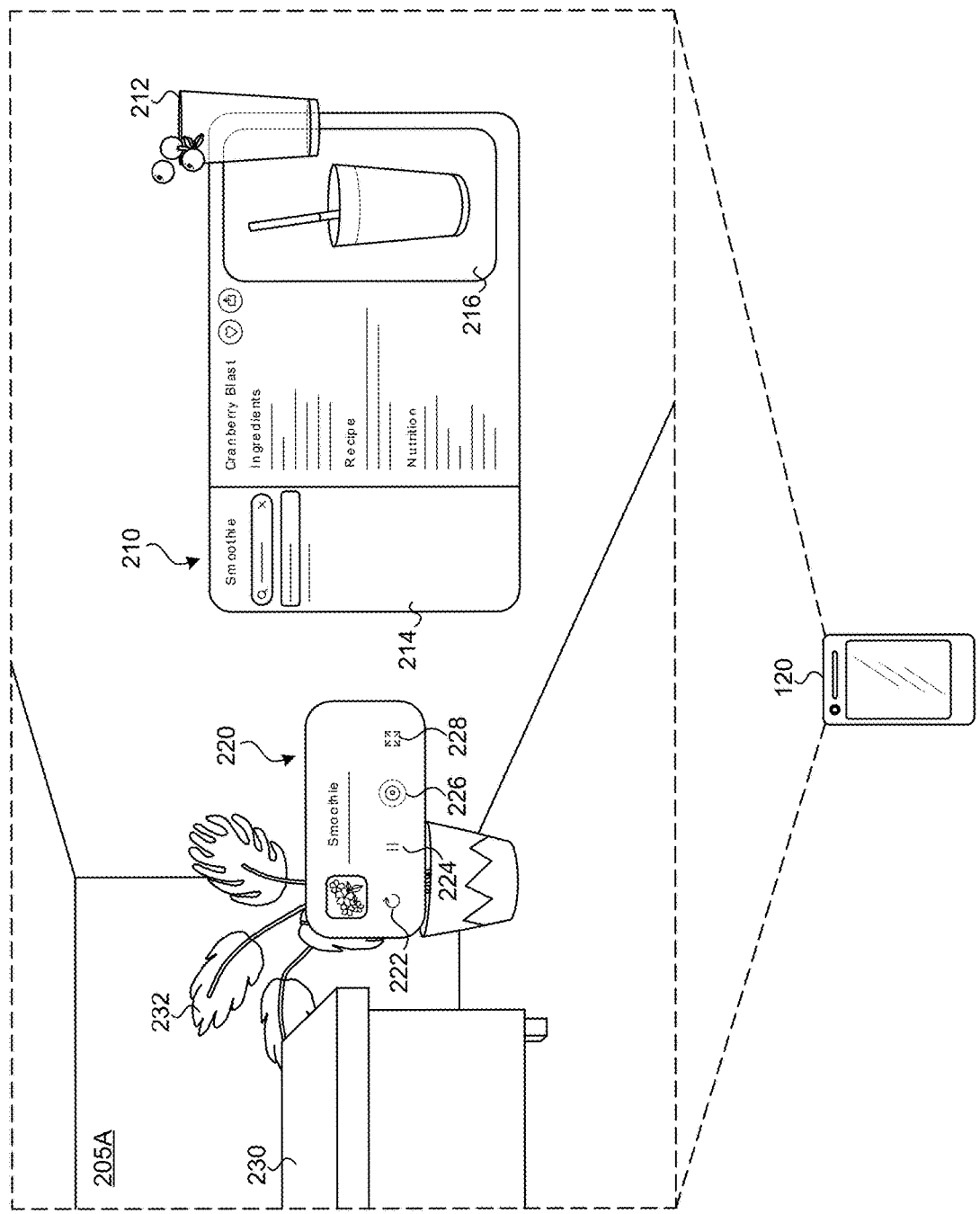
FIGS. 2A-2C illustrate example views provided by the first device of FIG. 1, the views including an integrated development environment (IDE) within the physical environment in accordance with some implementations.
Figure 2B:
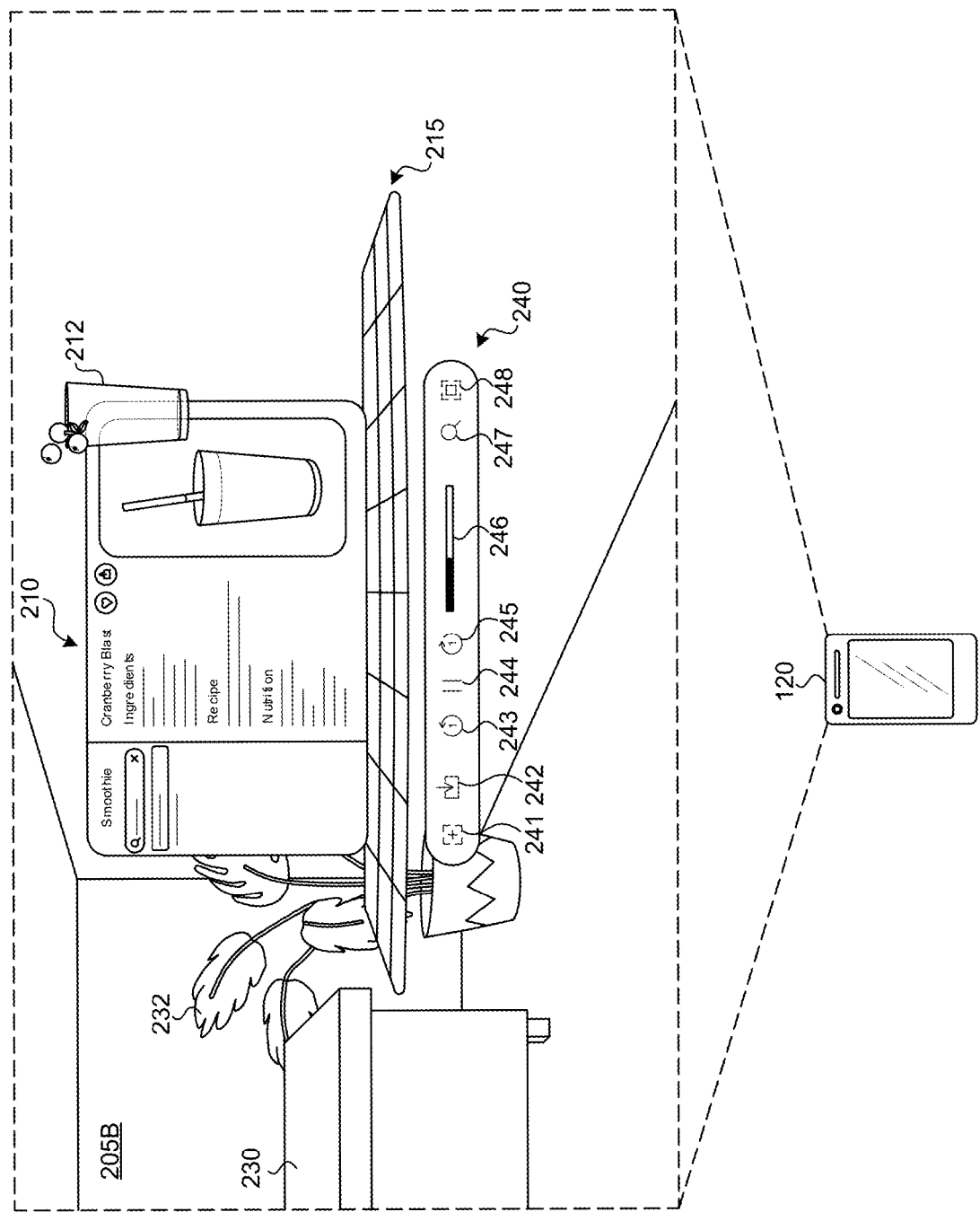
Figure 2C:
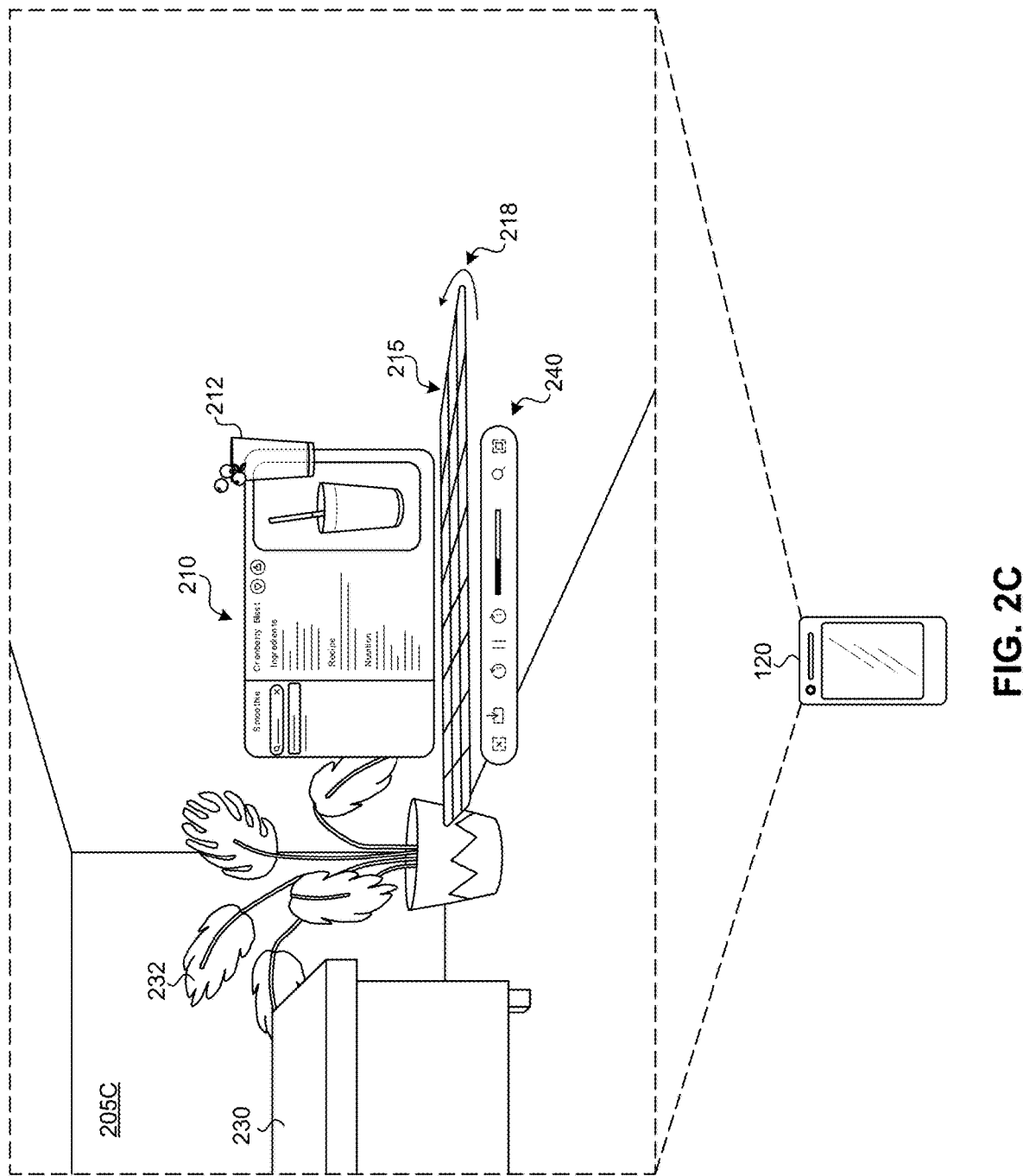

FIGS. 2A-2C illustrate exemplary views provided by the display elements of first device 120. The views present an XR environment that includes aspects of an IDE and aspects of a physical environment (e.g., environment 105 of FIG. 1). The view 205A depicted in FIG. 2A, view 205B depicted in FIG. 2B, view 205C depicted in FIG. 2C provide a view of the physical environment 105 from a viewpoint facing towards the corner of the desk 130 and plant 132. The views 205A-C include a representation 230 of the desk 130 and a representation 232 of the plant 132 from that viewpoint. However, the viewpoint as shown is for illustrative purposes only, as alternate viewpoints may be shown for either of the views 205A-C as the user moves throughout the physical environment 105.

The views 205A-C each include content that correspond to features of an IDE as a user is testing/running an application on via application element 210 (e.g., an application displayed within a bounded region of the 3D environment, such as a smoothie application). The application element 210 includes one or more features that may be displayed to a user in an XR environment and include interactable elements and/or display portions. For example, the application element 210 includes a search area 214, a product display area 216, and a 3D display element 212 (e.g., a 3D view of a container of a smoothie).

View 205A of FIG. 2A includes an inspector control element 220 (e.g., an application displayed within a bounded region of the 3D environment). The inspector control element 220 provides the user with controls during the testing and use of the application provided in the application element 210. The inspector control element 220 includes interactable controls such as a restart control 222 for restarting the application, a pause/resume control 224 for pausing the application at a current point in time and/or resuming the application (e.g., changes between a pause and resume control icon based on a current status), a record control 226 for recording the testing/use of the application (e.g., running smoothie application), and a debug visualization control 228 that provides the user with additional control options as illustrated in views 205B and view 205C of FIGS. 2B and 2C, respectively.

Views 205B and 205C of FIGS. 2B and 2C, respectively, include a bounded volume element 215 and an inspector control element 240 associated with the bounded volume element 215 for two different viewpoints. For example, view 205B includes an example view looking at the application element 210 during the testing of the application (e.g., looking directly at the application), and view 205C includes an example view of for a user that has reoriented (e.g., turned counterclockwise 20 degrees) the view of the application element 210 by turning the bounded volume element 215 as indicated by directional arrow 218 after a recording session (e.g., inspecting a recording of the application from a different viewpoint). In some implementations, the directional arrow 218 is displayed to the user as an icon for viewing. Additionally, the directional arrow 218 may be selectable to press, hold, and turn the application element 210 via the bounded volume element 215. The bounded volume element 215 may also be referred to as a 3D trey or 3D platter that provides a view that includes the capture (e.g., recording) of the application element 210 and provides a visualization of the application element 210 as anchored to the bounded volume element 215 (e.g., sitting on top of the 3D trey/platter).

The inspector control element 240 provides the user with controls during the testing and use of the application provided in the application element 210. The inspector control element 240 may be similar to the inspector control element 220, but the inspector control element 240 includes additional controls associated with the bounded volume element 215 and the viewing of the recording of the testing of the application element 210. The inspector control element 240 includes interactable controls such as a debug visualization control 241 to initiate a display of debug visualizations that provides the user with additional control options or a different viewing display, an output control 242 for sending the capture/recording of the application and associated characteristics to an inspection/debugging application, a rewind control 243 and forward control 245 to rewinding/forwarding the recording of the application, respectively, a pause/resume control 244 for pausing the application at a current point in time and/or resuming the application (e.g., changes between a pause and resume control icon based on a current status), and an interactive time bar 246 for displaying a current time of the testing/use of the application. In some implementations, the interactive time bar 246 for displaying a current time can be selectable so that the user can drag to a particular point in time to inspect the content. Of application element 210 at a particular point in time during the recording. Additionally, the inspector control element 240 includes additional interactable controls such as a loupe control 247 for providing an interaction tool to inspect portions of the application element 210 (e.g., a magnifying glass), and a bounded volume fit control 248 that automatically adjusts the content to fit within the bounded volume element 215. For example, the bounded volume fit control 248 scales the recording to a particular size (e.g., scale the recording down to fit within the bounds of the tray).

In some implementations, the content being developed for the application element 210 may include multiple portions (e.g., windows, panes, other virtual objects) that may be selected and moved by the user or the system in any 3D location within the viewing environment (e.g., view 205). For example, the user may have positioned application element 210 (e.g., at a 3D position) above the desk representation 230. Similarly, the first device 120 may enable the user to control or specify a preference regarding positioning of the application element 210 and/or the content being developed, e.g., whether the application content will be fixed in a 3D position always, fixed in a 3D position until a condition is satisfied, or provided at a fixed device location, as examples.

In some implementations, the content for the application element 210 being developed corresponds to or includes 3D content (e.g., 3D display element 212). For example, the content being developed may be executed or otherwise played to provide one or more static, moving, or interactive 3D objects (e.g., a user can move the 3D display element 212). The views provided by first device 120 may provide a separate representation of a 3D depiction of the content being developed. For example, the views may include the content in a preview application window that presents a 2D depiction of a ball, and a 3D depiction of a virtual object representing the ball. The view may present only a 2D view of content being developed, only a 3D view of content being developed, or both a 2D view and a 3D view. Moreover, the content being developed may include both 2D portions and 3D portions. For example, the content being developed may be an application that has a 2D user interface that includes one or more 3D objects. The view may provide the 2D portions in a 2D preview window and present the 3D portions using one or more 3D representations.

In some implementations, the first device 120 may enable the user to inspect the 3D depiction of the application element 210 and/or the 3D display element 212. The device may enable inspection of the 3D depiction of the application element 210 from different viewpoints, for example, by fixing the 3D location of the 3D display element 212 relative to the physical environment 105 and enabling the user to move around and view different sides of the 3D depiction of the application element 210 and/or the 3D display element 212 from different viewing positions. The ability to inspect the content of the application element 210 (e.g., 3D display element 212) during development may facilitate, simplify, and improve the efficiency of the development process. The content being developed may have time-based and/or include interactive features (e.g., video content, user interface content, interactive 3D objects, media content, etc.) and the view may facilitate playing, testing, and/or debugging such features. For example, a preview window may enable a user to play and view a time-based 2D and/or 3D portion of the content. As another example, a virtual object may respond to interaction according to response behaviors specified in the content being developed, e.g., responding to user input that causes a virtual object to move downward and appear to bounce off of the depiction of the physical environment floor.

In some implementations, the content (e.g., application element 210, bounded volume element 215, and inspector control elements 220 and 240) is presented in an anchored 3D position relative to the physical environment 105. The content thus appears in a fixed 3D position in the mixed reality environment for different views from different viewpoints. For example, as illustrated in FIG. 2A, the application content for the application element 210 being developed (e.g., a smoothie application) is displayed above the plant representation 232 at respective locations on the display of the first device 120 based on defined 3D coordinate locations relative to a 3D environment, e.g., a coordinate system based on the physical environment 105. Views from different viewpoints may be based on those fixed 3D coordinate locations and thus the application element 210 being developed may appear to be anchored (e.g., above the plant representation 232) in the physical environment 105. As a user changes the viewpoint, e.g., by moving the first device 120 while working on developing content, the content being developed may remain anchored above the plant representation 232. Thus, if the first device 120 is moved to a different viewpoint (e.g., a user moves his or her head while wearing an HMD), the content such as the application element 210 may remain anchored above the plant representation 232 in the views provided by the first device 120. Alternatively, the content may be anchored to a 3D viewing location of the user. Thus, if the first device 120 is moved to a different viewpoint (e.g., a user moves his or her head while wearing an HMD), the content such as the application element 210 would not remain anchored above the plant representation 232 and would stay within the view of the user via the display elements of the first device 120 (e.g., anchored to a pixel location). Such display of different sets of full and limited IDE options may facilitate the development, playing, testing, and/or debugging of content using an IDE in a 3D environment.

Figure 3:
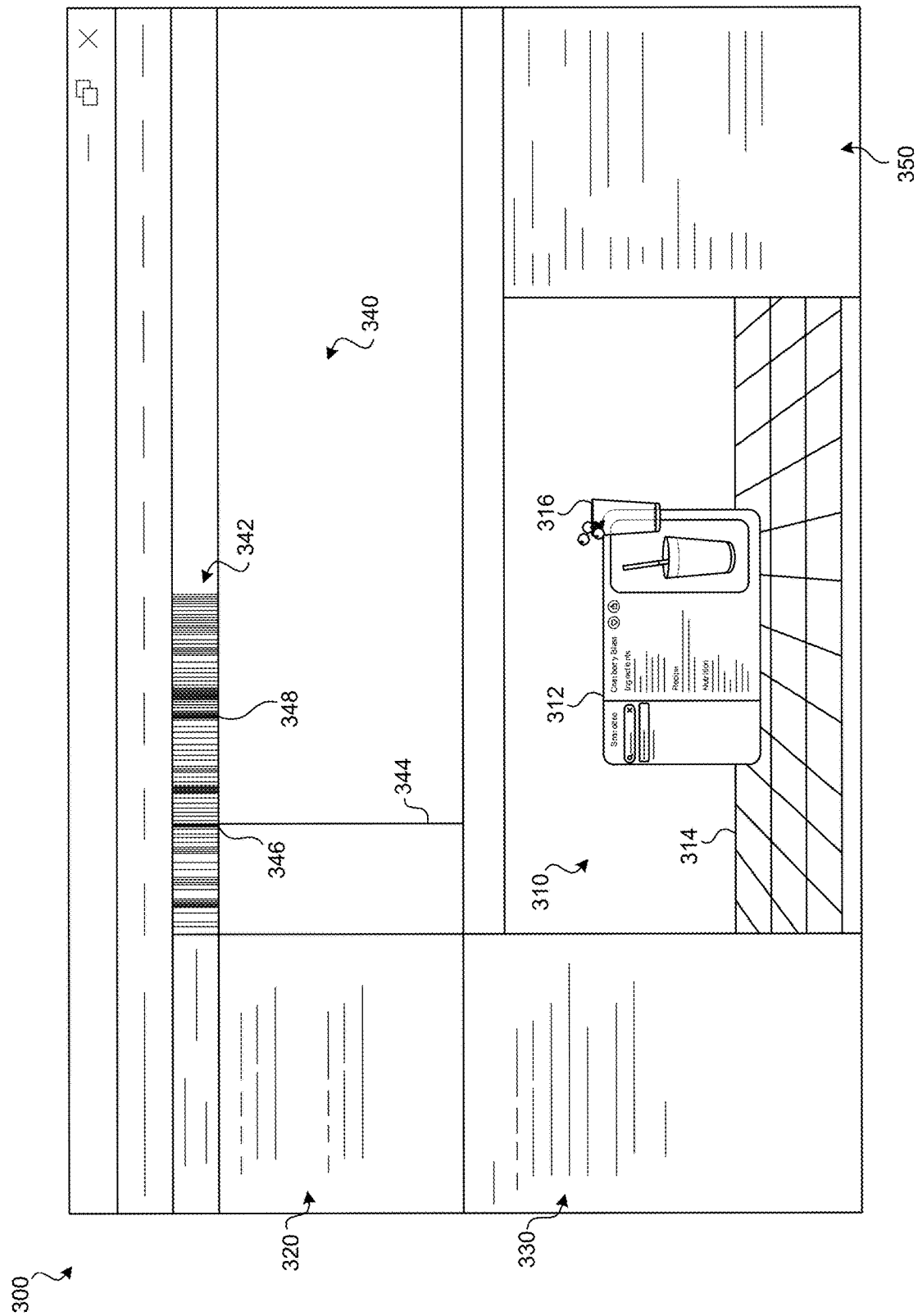
FIG. 3 illustrates an example screenshot of a user interface provided by the second device of FIG. 1, the user interface including a set of debugging tools, element-specific state information, and interaction visualizations in accordance with some implementations.

FIG. 3 illustrates an example screenshot of a user interface 300 provided by the second device 150, the user interface including a set of debugging tools, element-specific state information, and interaction visualizations in accordance with some implementations. The exemplary user interface 300 may include multiple portions (e.g., windows, features, controls, etc.) to provide an interface for an IDE for a user (e.g., user 102) and content being developed during the testing/running of application element 210 while being displayed at a device (e.g., viewing the user interface 300 at the second device 150). For example, the exemplary user interface 300 includes a set of debugging tools at the debugging interface portion 330, element specific and environment specific state information at the state information portion 350, system performance information at the system performance portion 320, interaction visualizations at the simulation portion 310, and an interactive activity timeline at the timeline portion 340.

The simulation portion 310 includes interaction visualizations of a recording of the testing of the application element 210 of FIGS. 2A-2C. The simulation portion 310 may include a representation 312 of the application element 210 and a bounded volume element 314 which may include similar functionality of the bounded volume element 215 as described herein. In some implementations, the visualization of the 3D appearance of the application (e.g., simulation portion 310) enables display of the application from a viewpoint that is different than the viewpoint of the device during the capturing of the recording. For example, a simulation of the application that was recorded at a first viewpoint, but the simulation portion 310 allows a user to rotate the application for different viewpoints (e.g., rotate the view of the application by 30 degrees to view an occurrence of an error). For example, based on a position of the user's device during execution, the user may playback from the same viewpoint or may change the viewpoint and see depictions of where the HMD was, the gaze direction, etc. In some implementations, the user may change the viewpoint to observe a scene understanding, (e.g., head position, hand position, a 3D reconstruction mesh, etc.).

The system performance portion 320 includes one or more performance metrics during a time period (e.g., at instance 344 of activity timeline 342 as viewed in the timeline portion 340). Performance metrics may provide the user with memory size, speed, bandwidth, etc., that play a key role in both CPU and I/O performance. The performance metrics displayed in the system performance portion 320 may include memory usage, network usage at an instance, CPU performance and vector processing (e.g., instructions per second), graphics performance (e.g., rendering, such as pixels per second), I/O performance (e.g., transactions per second), internet performance (e.g., bandwidth utilization), and the like.

The timeline portion 340 (e.g., a scrubber tool) provides a visualization of the activities performed during the recording of the testing of running the application element 210, e.g., the scene and other content, may be rendered continuously/live throughout the execution and playback via a scrubber tool. The activity timeline 342 includes a plurality if marks (e.g., "tick marks") something that changed in the application state, where each mark (e.g., mark 346, mark 348, etc.) illustrates to a user (e.g., a debugger) that something occurred at each of those respective points in time (e.g., showing a developer when the color of a text label changed, when a ball started to grow in size, or any change in a 2D/3D scene that may need to be indicated). For example, FIG. 3 illustrates an instance of time of viewing the application element 210 at an instance associated with mark 346 of the activity timeline 342. In some implementations, the line 344 of the instance associated with mark 346 is an interactable element that allows the user to slide (e.g., hold down and drag) the interactable line 344 along the activity timeline 342 to another point in time (e.g., move from mark 346 to mark 348). Additionally, as displayed by the activity timeline 342, particular periods of time show more activity than others (e.g., the application element 210 is more active at different periods of time such as rendering movement of the 3D display element 212).

In some implementations, the debugging interface portion 330 includes a list of elements or objects of the application element 210 that a user can select in the list to access additional information (e.g., displayed in the state information portion 330). In some implementations, the debugging interface portion 330 further includes controls for a code compiler, a code interpreter, a class browser, an object browser, a class hierarchy diagram, so forth, for use in software development. Additionally, or alternatively, in some implementations, the debugging interface portion 330 may include a source code editor as a coding interface. The coding interface within the user interface 300 may allow the user to make changes directly to the code either during execution of the application element 210 or while displaying the application element 210 at a particular time (e.g., a particular time an error occurs). During a debugging session, a user may utilize the user interface 300 for debugging, using an integrated debugger, with support for setting breakpoints in the editor, visual rendering of steps, etc.

The state information portion 350 of the user interface 300 includes information regarding one or more elements of the application element 210. For example, showing that a ball element has a current radius value "10", color equal to "blue," velocity="15," parent="none", etc. The element information displayed in the state information portion 350 may be automatically displayed/listed based on the activity of the application element 210 as the recording is being played (e.g., a developer can see the values changing over the duration of the recording). Additionally, or alternatively, the element information displayed in the state information portion 350 may be displayed based on user interaction with selecting an item(s). For example, a user may select an object (e.g., 3D object 316 representing 3D display element 212) within the simulation portion 310 during the playback and/or select the object within the list of objects displayed in the debugging interface portion 330.

Additionally, the state information portion 350 may further include information regarding one or more elements of the environment upon which the application element 210 is displayed (e.g., information about the background environment such as physical environment 105). For example, an error may occur during the display of the application element 210 that is not aligned properly with a piece of furniture in the physical environment, such as a table. Selecting the table may provide information about the height of the table, or a tilt of the plane of the top of the table, etc. Some applications for the application element 210 (e.g., AR elements) interact with physical elements, and thus detected properties of the physical elements may be important for the proper functionality of the application and for debugging purposes. For example, an application may be creating a mask around a person or an animals face or body, and properties (such as a speed of movement of the object) may be obtained and displayed so that a user (e.g., a debugger) may ascertain why a particular error occurred when displaying content.

Figure 4:
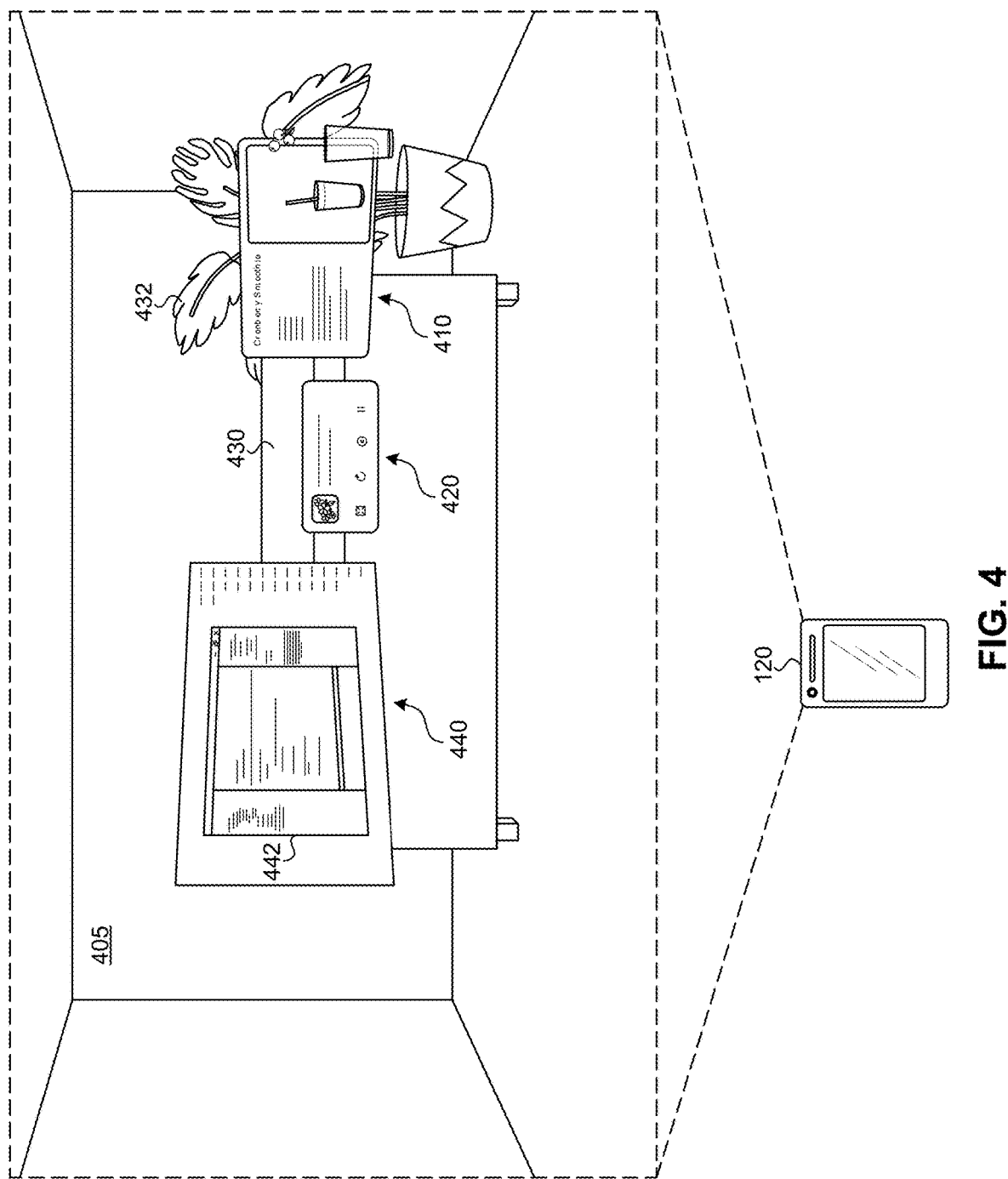
FIG. 4 illustrates an example view provided by the first device of FIG. 1, the view including the IDE of FIGS. 2A-2C and the example screenshot of a user interface of FIG. 3 within the physical environment in accordance with some implementations.

FIG. 4 illustrates an example view 405 provided by the display elements of first device 120 of FIG. 1. The view 405 presents an XR environment that includes aspects of an IDE and aspects of a physical environment (e.g., environment 105 of FIG. 1). The view 405 depicted in FIG. 4 provides a view of the physical environment 105 from a viewpoint facing towards the center of the desk 130 and plant 132. The view 405 includes a representation 430 of the desk 130 and a representation 432 of the plant 132 from that viewpoint. However, the viewpoint as shown is for illustrative purposes only, as alternate viewpoints may be shown for either of the view 405 as the user moves throughout the physical environment 105.

The view 405 includes similar elements as view 205A of FIG. 2. For example, the view 405 includes content that correspond to features of an IDE as a user is testing/running an application on via application element 410 (e.g., an application displayed within a bounded region of the 3D environment, such as a smoothie application) and includes an inspector control element 420 (e.g., an application displayed within a bounded region of the 3D environment). Additionally, the view 405 includes a user interface portal 440 that includes a debugging interface element 442 that allows a user to interact with a debugging user interface (e.g., user interface 300 as described herein). For example, the user interface portal 440 replicates a viewing element that duplicates the display of the second device 150. For example, instead of running the debugging tools of the user interface 300 at the second device 150, a user can view and interact with the debugging interface element 442 while the application element 410 is being viewed via the first device 120 (e.g., wearing an HMD). For example, the user can view the application state, user information, system performance information, and physical environment information during the testing of the application element 410 via the debugging interface element 442.

Figure 5:
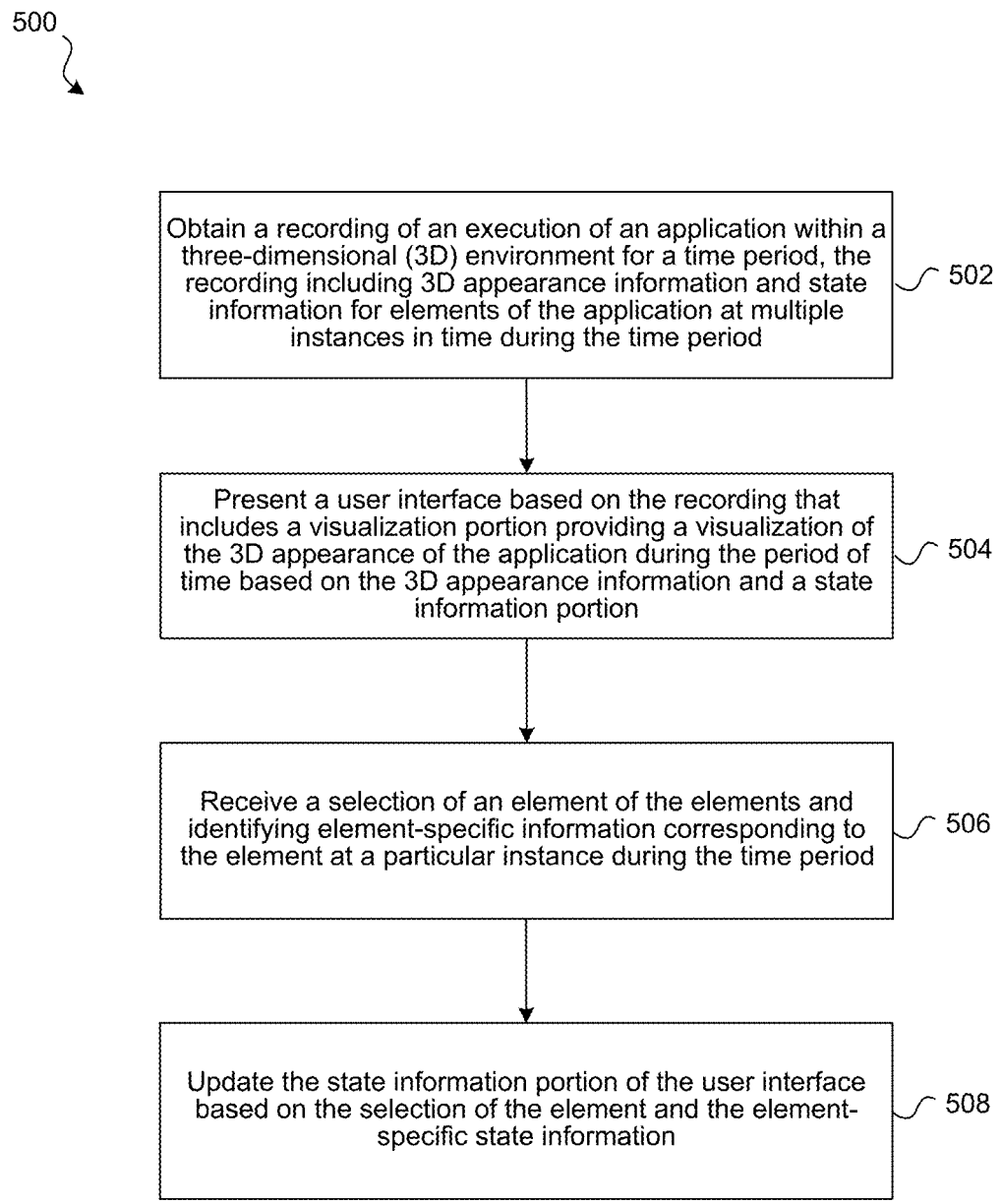
FIG. 5 is a flowchart representation of an exemplary method that provides a user interface within a 3D environment in accordance with some implementations.

FIG. 5 is a flowchart representation of an exemplary method 500 that provides an inspection and debugging user interface and associated workflow using a recording corresponding to a period of time during the use/testing of an application providing content in a 3D environment (e.g., an XR environment on an HMD) in accordance with some implementations. In some implementations, the method 500 is performed by a device (e.g., second device 150 of FIG. 1), such as a mobile device, desktop, laptop, or server device. In some implementations, the device has a screen for displaying images and/or a screen for viewing stereoscopic images such as a head-mounted display (HMD) (e.g., or first device 120 of FIG. 1). In some implementations, the method 500 is performed by processing logic, including hardware, firmware, software, or a combination thereof. In some implementations, the method 500 is performed by a processor executing code stored in a non-transitory computer-readable medium (e.g., a memory). The content presentation process of method 500 is illustrated with examples with reference to FIGS. 2-4 and illustrated as a system flow diagram with reference to FIG. 6.

At block 502, the method 500 obtains a recording of an execution of an application within a 3D environment for a time period, the recording including 3D appearance information and state information for elements of the application at multiple instances in time during the time period. For example, a device (e.g., second device 150) obtains from another device (e.g., first device 120) a recording during use of an application (e.g., a smoothie application as provided in application element 210). The recording may include, for example, snapshots of the application object, a user skeleton, viewpoints of the device such as viewing perspectives and pose information of an HMD, environment object position data, system performance data, and the like. The recording may involve grabbing/reusing those changes and writing them to an interactive 3D video file (e.g., a 3D video file that records scene content snapshots and changes). In some implementations, the recording of the execution of the application is generated on an HMD that captures application state, user information, system performance information, and physical environment information. In some implementations, during execution of the application, the views of the scene are presented on an HMD (e.g., view 205 of FIGS. 2A-2C shows the inspector control element 220 and the application element 210).

At block 504, the method 500 presents a user interface based on the recording that includes a visualization portion providing a visualization of the 3D appearance of the application during the period of time based on the 3D appearance information and a state information portion. The user interface (e.g., user interface 300 of FIG. 3) may be an inspection and debugging user interface using a recording corresponding to a period of time during the use/testing of an application providing content in a 3D environment (e.g., a smoothie application as provided in application element 210).

The visualization portion of the user interface may include a simulator (e.g., simulation portion 310 of user interface 300). In some implementations, the visualization of the 3D appearance of the application (e.g., simulation portion 310) enables display of the application from a viewpoint that is different than the viewpoint of the device during the capturing of the recording. For example, a simulation of the application that was recorded at a first viewpoint, but the simulation portion 310 allows a user to rotate the application for different viewpoints (e.g., rotate the view of the application by 30 degrees to view an occurrence of an error). For example, based on a position of the user's device during execution, the user may playback from the same viewpoint or may change the viewpoint and see depictions of where the HMD was, the gaze direction, etc. In some implementations, the user may change the viewpoint to observe a scene understanding, (e.g., head position, hand position, a 3D reconstruction mesh, etc.).

The user interface may further include a state information portion (e.g., state information portion 350 of user interface 300) that includes information regarding one or more elements of the application (e.g., showing that the ball element has a current radius value "10", color equal to "blue," velocity="15," parent="none", etc.).

In some implementations, the user interface further includes a system performance portion. For example, the user interface of 300 of FIG. 3 includes the system performance portion 320 that may include memory usage, network usage at an instance during the time period (e.g., at instance 344 of activity timeline 342 as viewed in the timeline portion 340).

In some implementations, the user interface further includes user information. For example, the user information for an instance of time may be displayed as the user is testing the application such as hand location and pose information, head pose information, gaze, and the like. The user information may be provided in the state information portion 350.

In some implementations, the user interface further includes environment information. For example, environment information for an instance of time may be displayed as the user is recording the testing of an application, such as information about a wall to which the application may be anchored, or other information about the physical objects in the environment as the user is executing and testing the application. The environment information may be provided in the state information portion 350.

In some implementations, the user interface further includes time scrubbing tools for identifying the multiple instances in time. For example, time scrubbing tools may include access to a series of snapshots with the ability to pause, rewind, fast-forward, and the like, at an instance during a time period (e.g., at instance 344 of activity timeline 342 as viewed in the timeline portion 340).

At block 506, the method 500 receives a selection of an element of the elements and identifying element-specific information corresponding to the element at a particular instance during the time period. For example, a user selects an object and/or the user selects a particular instance during the time period, e.g., when an error occurred or when the ball element turned from blue to red.

At block 508, the method 500 updates the state information portion of the user interface based on the selection of the element and the element-specific state information. For example, show state information for a ball element in the state-information portion (e.g., state information portion 350 of user interface 300).

In some implementations, the user interface is displayed on a 2D display. For example, the user interface 300 may be displayed on the second device 150 (e.g., a device that did not execute the application being tested). Additionally, or alternatively, the user interface is displayed on a 3D display within an XR environment (e.g., the HMD views of the recording). For example, as illustrated in FIG. 4, user interface portal 440 provides a user at 120 an option of also interacting with the debugging and visualization tools of the user interface 300 as described herein.

In some implementations, the method 500 further includes transmitting information to a second device, where the second device presents a second user interface, and one of the first device or the second device has a 2D display and the other of the device or the second device has a 3D display (e.g., the user interface can be displayed on the second device 150 such as a laptop, or may be viewed by the first device 120, such as an HMD). For example, as illustrated in FIG. 4, user interface portal 440 provides a user at 120 an option of also interacting with the debugging and visualization tools of the user interface 300 as described herein.

In some implementations, the method 500 further includes providing a selectable user interface option to export the recording to a second device having a different display type. For example, exporting from the second device 150 (e.g., a laptop) to the first device 120 (e.g., an HMD) or vice versa.

In some implementations, the method 500 further includes during execution of the application, an object of the application content is positioned based on a physics engine, and during playback, the object of the application content is positioned based on determining a position of the object based on the program state information and repositioning the object based on the changes.

In some implementations, the visualization of the 3D appearance of the application is displayed within a defining limited area (e.g., within or above the bounded volume/platter/trey app) within a 3D playback environment. In some implementations, the user interface includes controls to position and/or resize the 3D appearance of the application within the defining limited area. In some implementations, the method 500 further includes presenting a second set of views of the recording of the execution of the application. For example, the simulation portion 310 of user interface 300 may include an interactive set of views that allows you to interact with particular areas of the interactive 3D recording, such as the ability to move, resize, create a loupe to magnify area(s) of the application, and the like.

In some implementations, presenting the views of the 3D environment includes presenting video pass-through or see-through images of at least a portion of a physical environment, wherein a 3D reconstruction of at least the portion of the physical environment is dynamically generated.

In some implementations, the user may pause the recording and use a scrubber tool to go back to view a desired point in time. In some implementations, the user may playback from the same viewpoint or, alternatively, the user may change the viewpoint and see depictions of where the HMD was, such as based on the gaze direction. In some implementations, the user may change the viewpoint to observe scene understanding, (e.g., head position, hand position, 3D reconstruction mesh, etc.). In some implementations, a user may go back to enable display of representations of sound sources (e.g., spatialized audio) and other invisible items. In some implementations, a user may add data tracks.

Figure 6:
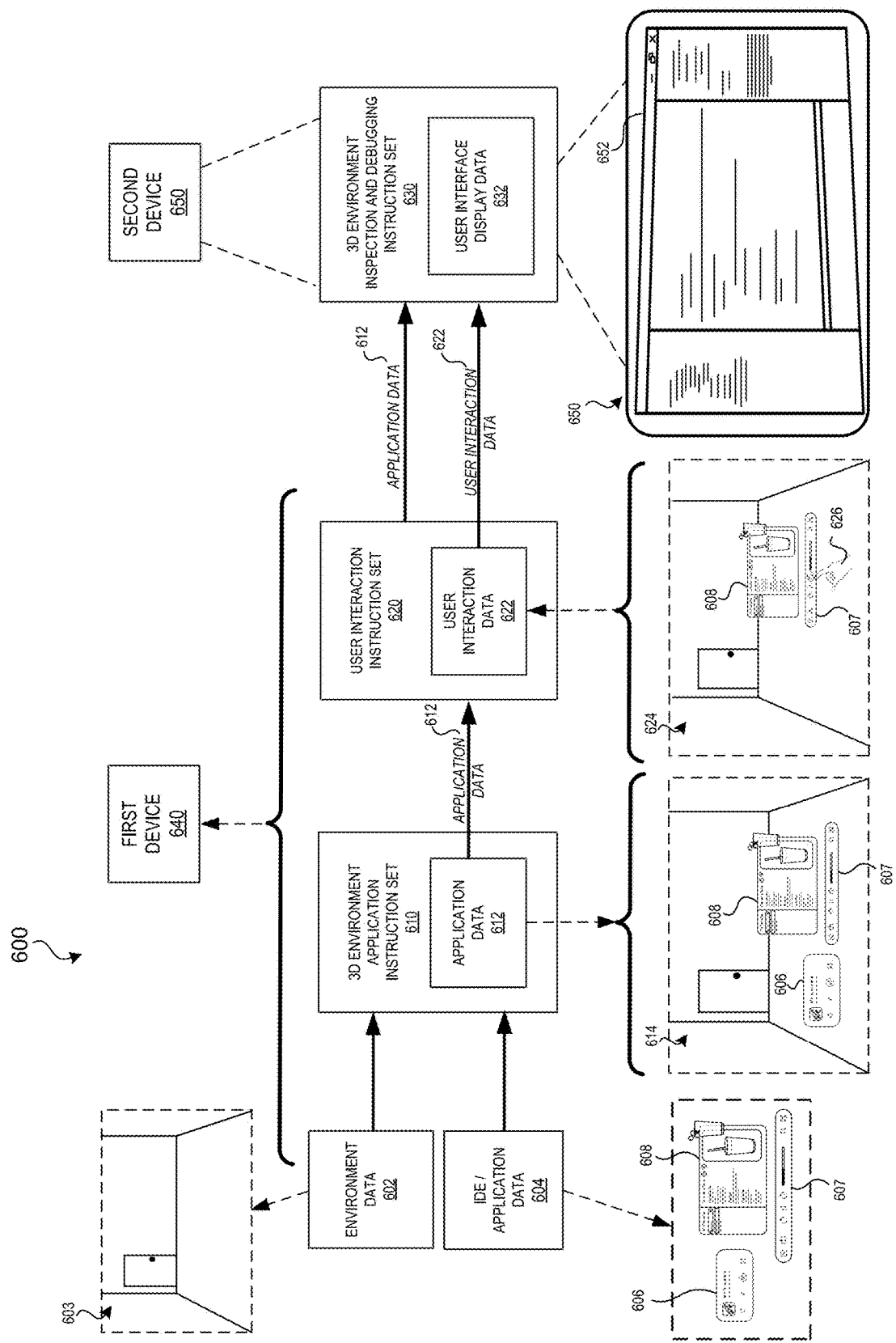
FIG. 6 is a system flow diagram of an example environment in which a system can integrate an integrated development environment and content within a 3D environment in accordance with some implementations.

FIG. 6 illustrates a system flow diagram of an example environment 600 in which a system can present a view that integrates an integrated development environment and content within a 3D environment according to some implementations. In some implementations, the system flow of the example environment 600 is performed on one or more devices (e.g., first device 120 and second device 150 of FIG. 1), such as a mobile device, desktop, laptop, or server device. The images of the example environment 600 can be displayed on a device that has a screen for displaying images and/or a screen for viewing stereoscopic images such as a HMD. In some implementations, the system flow of the example environment 600 is performed on processing logic, including hardware, firmware, software, or a combination thereof. In some implementations, the system flow of the example environment 600 is performed on a processor executing code stored in a non-transitory computer-readable medium (e.g., a memory).

The system flow of the example environment 600, at a first device 640 (e.g., first device 120 of FIG. 1), acquires environment data 602 (e.g., image data) from sensors of a physical environment (e.g., the physical environment 105 of FIG. 1), and acquires IDE/application data 604 from an IDE (e.g., an application program of application element 210 of FIG. 2), integrates the environment data 602 and the IDE/application data 604 to determine application data 612, obtains user interaction data (e.g., a user interacting with controls), and generates display data for a user to view a recording of an execution of an application program (e.g., to identify an occurrence of an error, if any). For example, a technique described herein can allow a user wearing an HMD, for example, to interact with application content of an application program, and be able to simulate and inspect a recording of the content on a debugging user interface (e.g., user interface 300) either at another device or at the same device (e.g., while wearing the HMD).

In an example implementation, the environment 600 includes an image composition pipeline that acquires or obtains data (e.g., image data from image source(s)) of the physical environment from a sensor on a device (e.g., first device 120 of FIG. 1). Example environment 600 is an example of acquiring image sensor data (e.g., light intensity data, depth data, and position information) for a plurality of image frames. For example, image 603 represents a user acquiring image data as the user is in a room in a physical environment (e.g., the physical environment 105 of FIG. 1). The image source(s) may include a depth camera that acquires depth data of the physical environment, a light intensity camera (e.g., RGB camera) that acquires light intensity image data (e.g., a sequence of RGB image frames), and position sensors to acquire positioning information. For the positioning information, some implementations include a visual inertial odometry (VIO) system to determine equivalent odometry information using sequential camera images (e.g., light intensity data) to estimate the distance traveled. Alternatively, some implementations of the present disclosure may include a SLAM system (e.g., position sensors). The SLAM system may include a multi-dimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location. The SLAM system may further be a visual SLAM system that relies on light intensity image data to estimate the position and orientation of the camera and/or the device.

In the example implementation, the environment 600 includes an application data pipeline that acquires or obtains IDE/application data (e.g., IDE/application data from IDE/application program source(s)). For example, the IDE/application data 604 may include IDE windows 606, 607 (e.g., control windows such as control elements 220, 240 of FIG. 2), and application content 608 (e.g., application element 210 of FIG. 2). The IDE/application data 604 may include 3D content (e.g., virtual objects) and user interaction data (e.g., haptic feedback of user interactions with the IDE and application).

In an example implementation, the environment 600 includes a 3D environment application instruction set 610 that is configured with instructions executable by a processor to generate application data 612. For example, the 3D environment application instruction set 610 obtains environment data 602 (e.g., image data of a physical environment such as the physical environment 105 of FIG. 1), obtains IDE/application data 604 (e.g., an IDE and a virtual application), integrates the environment data and IDE/application data (e.g., overlays the IDE windows and application onto a 3D representation of the physical environment), and generates application data 612. For example, the 3D environment application instruction set 610 analyzes the environment data 602 to generate a 3D representation (video passthrough, optical see through, or a reconstructed virtual room) of the physical environment and integrates the IDE/application data with the 3D representation so that a user, during execution of the application, views the IDE and application as an overlay on top of the 3D representation as illustrated in the example environment 614, that shows IDE windows 606, 607 and an application window for application content 608 overlaid on the environment data 602. The application data 612 may include information about one or more elements of the application program and one or more elements about the environment (e.g., environment data 602), that may be utilized to capture application state, user information, system performance information, and physical environment information as described herein.

In an example implementation, the environment 600 further includes a user interaction instruction set 620 that is configured with instructions executable by a processor to acquire the application data 612 from the 3D environment application instruction set 610 and obtain user interaction data 622 from user interactions with the IDE and application program. For example, the user interaction instruction set 620 can obtain interaction data of the user during execution of the IDE and the virtual multimedia application program based on user interaction information and changes to the IDE and content that are determined based on user interactions during execution of the application. For example, user interaction information may include scene understandings or snapshots, such as locations of objects in the environment, and user interaction with the controls (e.g., haptic feedback of user interactions such as hand pose information). In particular, as illustrated in the example environment 624, a user's hand 626 is shown as interacting with the IDE control window 607 for the associated IDE controls while viewing the application content 608 (e.g., application element 210).

In some implementations, a scene understanding may include head pose data, what the user is looking at in the application (e.g., a virtual object), hand pose information, and the like. Additionally, the scene understanding information may include a scene understanding mesh, such as a 3D mesh that is concurrently being generating during execution of the program.

In some implementations, the environment 600 includes an 3D environment inspection and debugging instruction set 630 that is configured with instructions executable by a processor to assess the application data 612 from the 3D environment application instruction set 610 and the user interaction data 622 from the user interaction instruction set 620 and presents a user interface 652 (e.g., user interface 300) that includes a set of debugging tools, element-specific state information, and interaction visualizations in accordance with some implementations. In some implementations, the set of views is displayed on the device display 650 of a second device 650 (e.g., second device 150 of FIG. 1). In some implementations, as illustrated in the example generated 3D environment 634, 3D environment inspection and debugging instruction set 630 generates user interface display data 632 that includes user interface 652.

Additionally, a scene understanding may include other data other than visual data. For example, spatialized audio may be part of the application element 210. Thus, the system application can play spatialized audio that is produced by the application element 210. In some implementations, a visual element (e.g., a virtual icon) may be presented to the user's viewpoint to indicate the location (e.g., the 3D coordinates) of where the spatialized audio is coming from at that moment in time during execution.

In some implementations, the 3D environment, e.g., the scene and other content, may be rendered continuously/live throughout the execution and playback via a scrubber tool. That is the rendering engine can run continuously injecting executing content during one period of time and recorded content at another period of time. In some implementations, playback may be different than simply reconstituting the content in the same way it was originally produced. For example, playback may involve using recorded values for a ball's position (e.g., 3D coordinates) rather than having the ball use the physics system (e.g., in a virtual bowling application). That is the user may pause the test and use a scrubber tool to go back to view a desired point in time.

Figure 7:
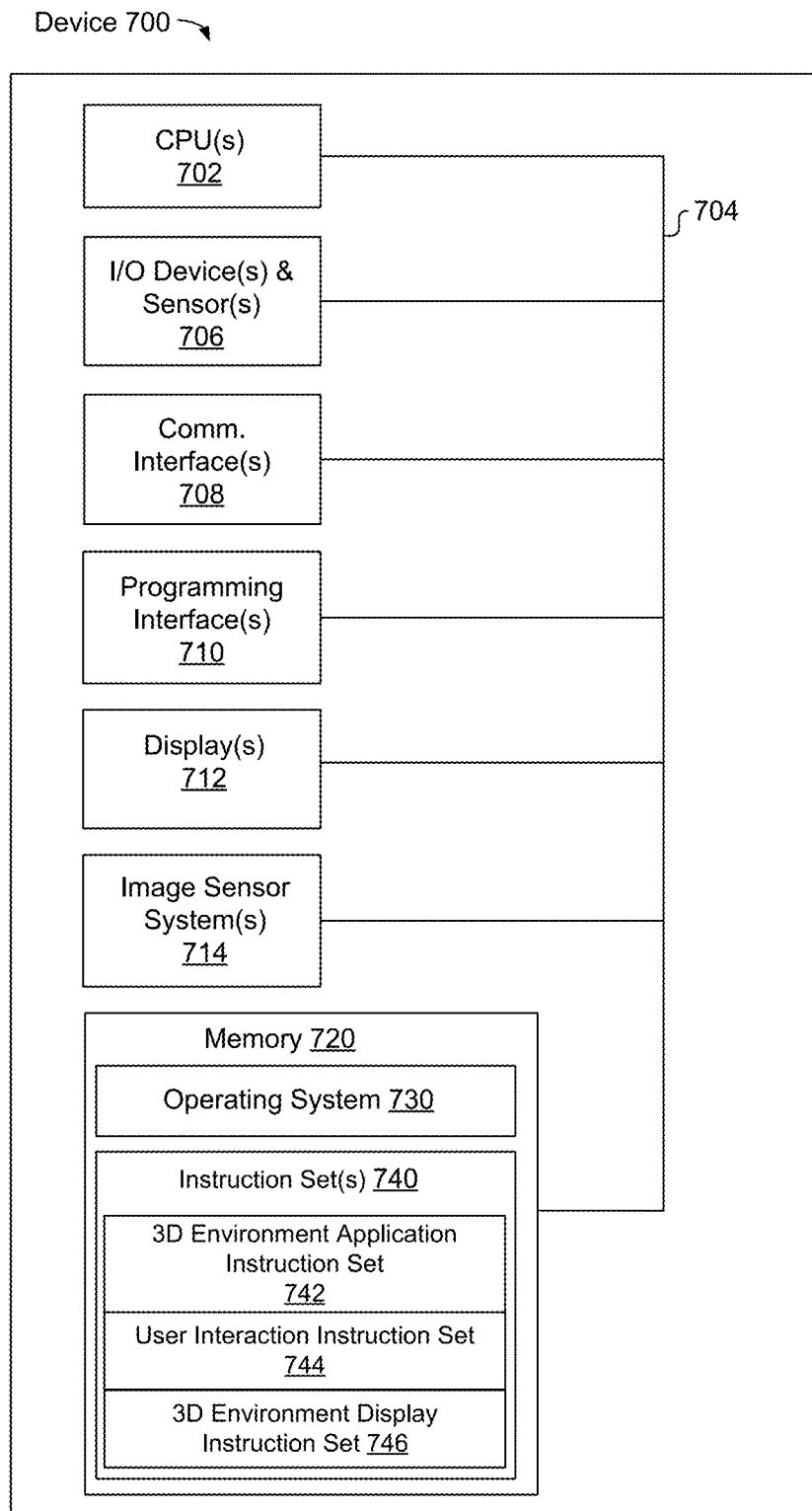
FIG. 7 is an example device in accordance with some implementations.

FIG. 7 is a block diagram of an example device 700. Device 700 illustrates an exemplary device configuration for first device 120 and/or second device 150 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 700 includes one or more processing units 702 (e.g., microprocessors, ASICs, FPGAs, GPUs, CPUs, processing cores, and/or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 12C, and/or the like type interface), one or more programming (e.g., I/O) interfaces 710, one or more displays 712, one or more interior and/or exterior facing image sensor systems 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 712 are configured to present a view of a physical environment or a graphical environment to the user. In some implementations, the one or more displays 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 712 correspond to diffractive, reflective, polarized, holographic, etc. waveguide displays. In one example, the device 700 includes a single display. In another example, the device 700 includes a display for each eye of the user.

In some implementations, the one or more image sensor systems 714 are configured to obtain image data that corresponds to at least a portion of the physical environment 105. For example, the one or more image sensor systems 714 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 714 further include illumination sources that emit light, such as a flash. In various implementations, the one or more image sensor systems 714 further include an on-camera image signal processor (ISP) configured to execute a plurality of processing operations on the image data.

In some implementations, the first device 120 and/or the second device 150 includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 10 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the first device 120 and/or the second device 150.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 includes a non-transitory computer readable storage medium.

In some implementations, the memory 720 or the non-transitory computer readable storage medium of the memory 720 stores an optional operating system 730 and one or more instruction set(s) 740. The operating system 730 includes procedures for handling various basic system services and for performing hardware dependent tasks. In some implementations, the instruction set(s) 740 include executable software defined by binary information stored in the form of electrical charge. In some implementations, the instruction set(s) 740 are software that is executable by the one or more processing units 702 to carry out one or more of the techniques described herein.

The instruction set(s) 740 include a 3D environment application instruction set 742, a user interaction instruction set 744, and a 3D environment display instruction set 746. The instruction set(s) 740 may be embodied as a single software executable or multiple software executables.

The 3D environment application instruction set 742 (e.g., 3D environment application instruction set 610 of FIG. 6) is executable by the processing unit(s) 702 to generate application data 612. For example, the 3D environment application instruction set 742 obtains environment data (e.g., image data of a physical environment such as the physical environment 105 of FIG. 1), obtains IDE/application data (e.g., an IDE and application), integrates the environment data and IDE/application data (e.g., overlays the IDE and application onto a 3D representation of the physical environment), records the state changes and scene understanding during execution of the IDE/application, and generates application data 612. For example, the application instruction set analyzes the environment data to generate a 3D representation (video passthrough, optical see through, or a reconstructed virtual room) of the physical environment and integrates the IDE and application data with the 3D representation so that a user, during execution of the application, views the IDE and application program as an overlay on top of the 3D representation, as illustrated herein with reference to FIGS. 2-4 and 6.

The user interaction instruction set 744 is configured with instructions executable by a processor to assess the application data from the 3D environment application instruction set 742 and obtains and records user interaction data with the IDE controls and/or application program within the 3D environment. For example, the user interaction instruction set 744 can obtain information during the execution of the IDE and application program based on user interaction information and changes to the IDE and content that are determined based on user interactions (e.g., haptic feedback) during execution of the IDE and application programs.

The 3D environment display instruction set 746 is configured with instructions executable by a processor to assess the application data from the 3D environment application instruction set 742 and the user interaction data from the user interaction instruction set 744 and presents a user interface 652 (e.g., user interface 300) that includes a set of debugging tools, element-specific state information, and interaction visualizations in accordance with some implementations Although the instruction set(s) 740 are shown as residing on a single device, it should be understood that in other implementations, any combination of the elements may be located in separate computing devices. Moreover, FIG. 7 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at an electronic device having a processor:
obtaining a recording of an execution of an application within a three-dimensional (3D) environment for a time period, the recording comprising 3D appearance information and state information for elements of the application at multiple instances in time during the time period;
receiving a selection of an element of the elements;
identifying element-specific information corresponding to the element at a particular instance during the time period; and
presenting state information associated with the selection of the element and based on the identified element-specific information, wherein the state information associated with the selection of the element is presented on a 2D display.

2. The method of claim 1, wherein a visualization of the 3D appearance of the application is presented during the time period based on the 3D appearance information.

3. The method of claim 2, wherein the visualization of the 3D appearance of the application enables display of the application from a viewpoint that is different than the viewpoint of the device during capturing of the recording.

4. The method of claim 2, wherein the visualization of the 3D appearance of the application is displayed within a defining limited area within a 3D playback environment.

5. The method of claim 4, further comprising presenting controls to position and/or resize the 3D appearance of the application within the defining limited area.

6. The method of claim 1, further comprising determining and presenting system performance information associated with the recording of the execution of the application within the 3D environment.

7. The method of claim 1, further comprising determining and presenting user information associated with a user for the recording of the execution of the application.

8. The method of claim 1, further comprising determining and presenting environment information associated with the recording of the execution of the application within the 3D environment.

9. The method of claim 1, wherein the state information associated with the selection of the element is presented on a 3D display within an extended reality (XR) environment.

10. The method of claim 1, further comprising:
transmitting information to a second device, wherein the second device presents the state information associated with the selection of the element on a 3D display.

11. The method of claim 1, further comprising:
providing a selectable user interface option to export the recording to a second device having a different display type.

12. The method of claim 1, wherein the multiple instances in time are identified based on interactions with a time scrubbing tool.

13. The method of claim 1, further comprising:
during execution of the application, an object of the application is positioned based on a physics engine; and
during playback, the object of the application is positioned based on determining a position of the object using program state information and repositioned based on identified changes.

14. The method of claim 1, further comprising:
presenting a second set of views of the recording of the execution of the application.

15. The method of claim 1, wherein the recording of the execution of the application is generated on a head-mounted device (HMD) that captures application state, user information, system performance information, and physical environment information.

16. A device comprising:
a non-transitory computer-readable storage medium; and
one or more processors coupled to the non-transitory computer-readable storage medium, wherein the non-transitory computer-readable storage medium comprises program instructions that, when executed on the one or more processors, cause the one or more processors to perform operations comprising:
obtaining a recording of an execution of an application within a three-dimensional (3D) environment for a time period, the recording comprising 3D appearance information and state information for elements of the application at multiple instances in time during the time period;
receiving a selection of an element of the elements;
identifying element-specific information corresponding to the element at a particular instance during the time period; and
presenting state information associated with the selection of the element and based on the identified element-specific information, wherein the state information associated with the selection of the element is presented on a 3D display within an extended reality (XR) environment.

17. The device of claim 16, wherein the program instructions, when executed on the one or more processors, further cause the one or more processors to perform operations comprising:
determining and presenting system performance information associated with the recording of the execution of the application within the 3D environment.

18. The device of claim 16, wherein the state information associated with the selection of the element is presented on a 3D display within an extended reality (XR) environment.

19. A non-transitory computer-readable storage medium, storing program instructions executable on a device to perform operations comprising:

obtaining a recording of an execution of an application within a three-dimensional (3D) environment for a time period, the recording comprising 3D appearance information and state information for elements of the application at multiple instances in time during the time period;

receiving a selection of an element of the elements;

identifying element-specific information corresponding to the element at a particular instance during the time period; and presenting state information associated with the selection of the element and based on the identified element-specific information, wherein the state information associated with the selection of the element is presented on a 2D display.

* * * * *